United States Patent [19]

Ehrgott et al.

[11] B 3,995,064

[45] Nov. 30, 1976

[54] METHOD AND APPARATUS FOR FORMING CHEWING GUM BASE AND PRODUCT

[75] Inventors: Charles W. Ehrgott, Katonah, N.Y.; Raymond L. Roy, Danbury, Conn.

[73] Assignee: Life Savers, Inc., New York, N.Y.

[22] Filed: June 4, 1975

[21] Appl. No.: 583,712

[44] Published under the second Trial Voluntary Protest Program on February 10, 1976 as document No. B 583,712.

[52] U.S. Cl. .................................................. 426/3
[51] Int. Cl.² ........................ A23G 3/30; A23G 3/00
[58] Field of Search ..................... 426/3–6

[56] References Cited

UNITED STATES PATENTS

| 2,489,147 | 11/1949 | Lougovoy | 426/3 |
| 2,635,964 | 4/1953 | Hewitt | 426/3 |
| 3,666,492 | 5/1972 | Teng | 426/3 |

*Primary Examiner*—Jeanette M. Hunter
*Attorney, Agent, or Firm*—Lawrence S. Levinson; Merle J. Smith; Burton Rodney

[57] ABSTRACT

Chewing gum base is prepared by separately blending selected groups of ingredients, and then combining and mixing the groups in predetermined order.

14 Claims, 1 Drawing Figure

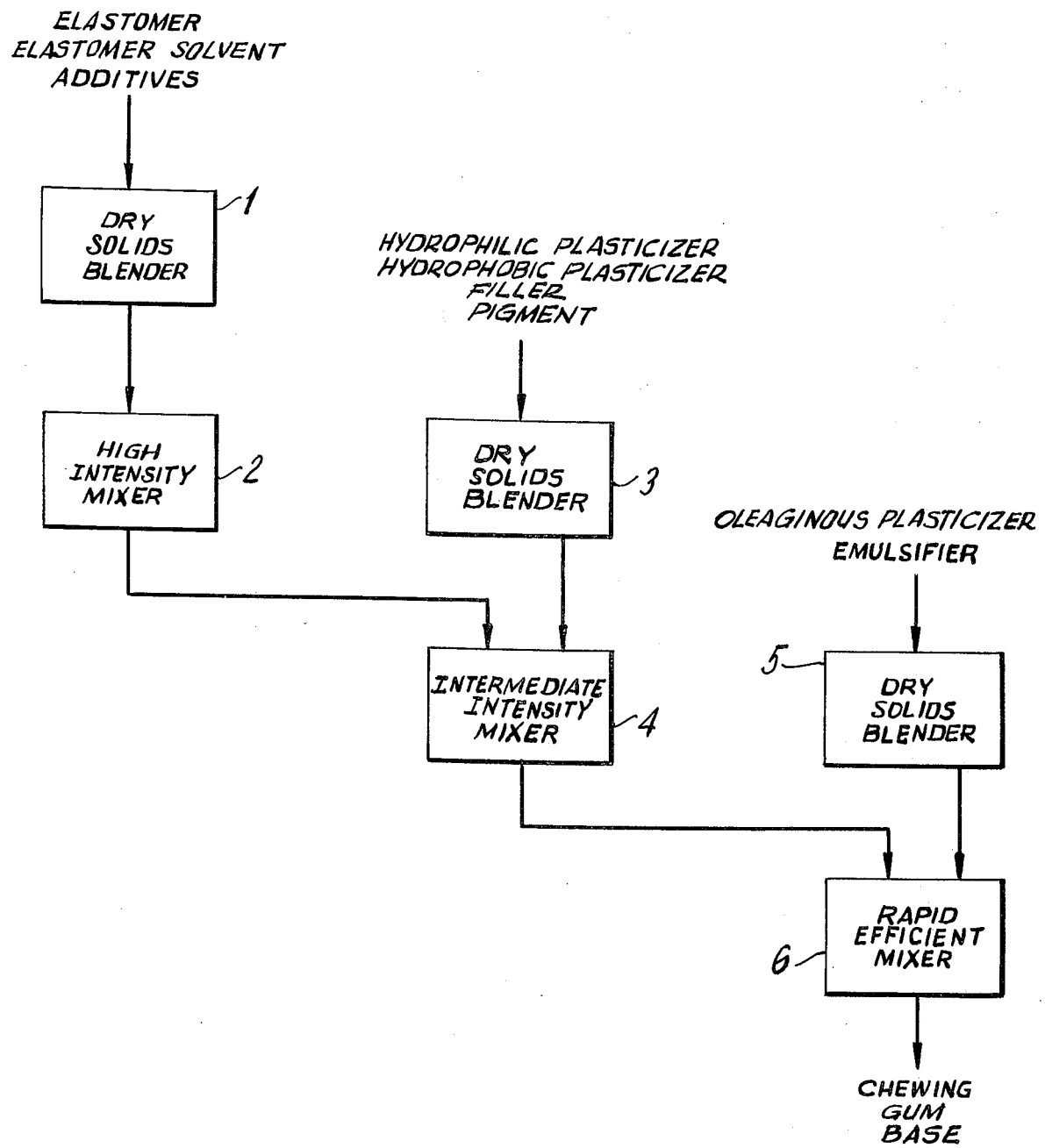

METHOD AND APPARATUS FOR FORMING CHEWING GUM BASE AND PRODUCT

BACKGROUND OF THE INVENTION

Chewing gum conventionally has been manufactured on a batch basis using liquid latex. The process is time consuming in its labor and machinery requirements.

OBJECTS OF THE INVENTION

It is an object of the present invention to provide an efficient method for the batch or continuous manufacture of chewing gum base. Another object is to provide a method for the manufacture of chewing gum base which employs a solid elastomer. A further object is to provide a faster and more economical process for the manufacture of chewing gum base than prior art processes. These and other objects of the present invention will be apparent from the following description.

SUMMARY OF THE INVENTION

It has now been found that chewing gum base may be prepared in accordance with the process of the invention quickly and economically by separately blending selected groups of ingredients, and then combining and mixing the groups in predetermined manner and in predetermined order. The process of the invention may be carried out batchwise or in a continuous manner, with the latter being preferred. More specifically, the process for preparing a chewing gum base, in accordance with the invention, comprises mixing chewing gum elastomer and elastomer solvent under high shear conditions to form a first dry solids mixture, mixing the first dry solids mixture with hydrophobic plasticizer and hydrophilic plasticizer under reduced shear conditions and increased folding action to form a second mixture and mixing the second mixture with oleaginous plasticizer and emulsifier under rapid folding action and substantially no shear to form a chewing gum base.

Furthermore, in accordance with the present invention, an apparatus is provided for use in carrying out the above process which apparatus comprises, in combination, high intensity mixing means for mixing chewing gum elastomer solids and elastomer solvent under high shear conditions for form a first dry solids mixture; intermediate intensity mixing means in communication with said high intensity mixing means, for mixing hydrophobic plasticizer and hydrophilic plasticizer and said first dry solids mixture under reduced shear conditions and increased folding action; rapid efficient mixing means in communication with said intermediate intensity mixing means, for mixing oleaginous plasticizer and emulsifier and said second mixture under rapid folding action and substantially no shear to form chewing gum base; and means for recovering the chewing gum base from said rapid efficient mixing means.

BRIEF DESCRIPTION OF THE DRAWING

The drawing is a schematic flow sheet showing the process of the present invention.

DETAILED DESCRIPTION

A typical chewing gum base is formulated from natural and/or synthetic gums or elastomers, hydrophilic plasticizers, ester gums (elastomer solvent and hydrophobic plasticizers), oleaginous plasticizers, fillers, emulsifiers, pigments and additives such as anti-oxidants, stabilizers or preservatives. Examples of natural gums or elastomers are natural rubber, chicle, balata, sorva, guttapercha, lechi caspi and jelutong. Examples of synthetic gums or elastomers are polyisobutylene, isobutylene-isoprene copolymer and butadiene-styrene copolymer. The hydrophilic plasticizer is usually a synthetic resin, and examples of these are vinyl polymers such as polyvinyl acetate or partially hydrolyzed polyvinyl alcohol, or mixtures of the two. Ester gums function as elastomer solvent and as hydrophobic plasticizer. The elastomer solvent is a rosin derivative such as dimerized rosin ester, or glycerol ester of polymerized rosin or a terpene resin, such as polymers of β-pinene or α-pinene. The hydrophobic plasticizer includes esters of rosin and hydrogenated esters of rosin, such as the glyceryl esters of hydrogenated rosin or the glyceryl esters of partially hydrogenated rosin and the like. Fillers are optional and are usually inorganic materials such as $CaCO_3$, $MgCO_3$, $Al_2O_3$, talc and the like. The oleaginous plasticizer includes oleaginous materials like cocoa butter, hydrogenated vegetable oils, and waxes, such as petroleum waxes, like paraffin waxes, as well as polyethylene waxes. Small amounts of an emulsifier such as fatty acid monoglycerides or diglycerides or triglycerides, e.g., glyceryl monostearate, propylene glycol monostearate may be employed in preparing the gum. Inorganic pigments, e.g., $TiO_2$, or organic pigments, e.g., copper chlorphyllin, carbon black, β-carotene, Red No. 3, Blue No. 1, Yellow No. 5, or Yellow No. 6 may be used if desired to impart coloration to the gum. An antioxidant or preservative such as butylated hydroxyanisole or butylated hydroxytoluene may be used.

The term "plasticizer" as employed herein includes masticatory substances which function as softening agents for the elastomers.

The various ingredients are generally employed in the following percentages by weight:

| Ingredient | % by Weight |
| --- | --- |
| Elastomer | 5–15 |
| Elastomer Solvent | 5–20 |
| Hydrophilic Plasticizer | 20–35 |
| Hydrophobic Plasticizer | 5–15 |
| Oleaginous Plasticizer | 15–25 |
| Emulsifier | 10–15 |
| Filler | 0–25 |
| Pigment | 0–5 |
| Additives | 0–2 |

According to the process of the present invention the ingredients are separated into three groups. The first group comprises the natural or synthetic gums or elastomers, the elastomer solvent, and the additives. The second group comprises the hydrophilic plasticizer, hydrophobic plasticizer, filler and pigment. The third group comprises the oleaginous plasticizers and the emulsifiers. The novel process of the present invention is adapted to be carried out advantageously in batchwise or continuous manner, with the latter being preferred. Each group is preferably separately blended. The first group is then passed through a high intensity mixer, after which it is fed to an intermediate mixer, together with the second group of ingredients. The mixture of the first and second groups of ingredients is then fed to a rapid, efficient mixer, together with the third group of ingredients. However, it will be appreciated that each ingredient of the various groups of ingredients may be separately metered into its respective mixer without being previously blended. Furthermore, the various mixing operations carried out employing the above mixers may be carried out employing a single variable mixer.

The following is a description of a preferred process in accordance with the invention.

The first group of ingredients, that is, the elastomer, the elastomer solvent and additives is fed to a dry solids blender where a uniform mixing of the ingredients is obtained. From the blender, the mixture is fed to a feed belt which delivers the mixture in a predetermined amount by weight to a high intensity mixer. A high intensity mixer is one which effects a high degree of shear and in which a milling action is obtained due to small clearances between moving surfaces. The effluent from the high intensity mixer is a rubber, completely homogenous product which has no undispersed elastomeric particles and which can be stretched into a translucent film.

The second group of ingredients, that is, the hydrophilic plasticizer, the hydrophobic plasticizer, fillers and pigments is fed to a second dry solids blender where a uniform mixing of the ingredients is obtained. From the blender, the mixture is fed to a feed belt which delivers the mixture in a predetermined amount by weight to an intermediate intensity mixer. An intermediate intensity mixer is one which provides less of a shearing action and more of a folding action because clearances between moving surfaces are greater. The effluent from the intermediate intensity mixture is a dough-like subsubstance which can be stretched into a homogenous film which shows no individual particles. The effluent from the high intensity mixer is also fed to the intermediate intensity mixer where it is combined with the second group of ingredients.

The third group of ingredients comprising the oleaginous plasticizer and emulsifiers is fed to a dry solids blender. From the blender, the mixture is fed to a feed belt which delivers the mixture in a predetermined amount by weight to a rapid efficient mixer. A rapid efficient mixer is one which provides essentially no shearing action but a very rapid folding action. As the third group of ingredients enters the rapid efficient mixer, it is combined with the effluent from the intermediate intensity mixer which is also fed to the rapid efficient mixer. The effluent from the rapid efficient mixer is the finished chewing gum base which is then processed in conventional manner to obtain the final chewing gum product.

The foregoing sequence of mixing and blending has been found to be critical to the operability of the present invention. For example, if either the oleaginous plasticizer or the hydrophobic plasticizer is added to the first group of ingredients, a uniformly dispersed product cannot be obtained.

The following examples illustrate the present invention without, however, limiting the same thereto. All blenders and mixers are jacketed so that heat may be applied when necessary to insure efficient mixing, particularly when starting the process.

| Example 1 | |
|---|---|
| Ingredient | Parts by Weight |
| Elastomer latex solid | 8 |
| Terpene resin (of β-pinene) (Elastomer solvent) | 6 |
| Polyvinyl acetate (Hydrophilic plasticizer) | 28 |

-continued

| Example 1 | |
|---|---|
| Ingredient | Parts by Weight |
| Glyceryl ester of hydrogenated rosin (Hydrophobic plasticizer) | 8 |
| Paraffin wax (Oleaginous plasticizer) | 19 |
| Glyceryl monostearate (Emulsifier) | 14 |
| $CaCO_3$ (Filler) | 15 |
| Pigment | 2 |

The elastomer latex solids and terpene resin solvent are fed to a dry solids (ribbon) blender 1 and blended into a uniform mixture.

The polyvinyl acetate, calcium carbonate, and glyceryl ester of hydrogenated rosin are fed to a dry solids (ribbon) blender 3 and blended into a uniform mixture.

The paraffin wax and glyceryl monostearate are fed to a dry solids (ribbon) blender 5 and blended into a uniform mixture.

The effluent from blender 1 is fed to a high intensity mixer 2 and mixed into a homogeneous mass while passing through the mixer.

The effluent from blender 3 and the effluent from mixer 2 are both fed to an intermediate intensity mixer and combined into a dough-like homogeneous mixture while passing through the mixer.

The effluent from blender 5 and the effluent from mixer 4 are both fed to a rapid efficient mixer 6 and combined into the final chewing gum base while passing through the machine. The finished chewing gum base is subsequently processed in conventional manner for the preparation of sticks of chewing gum.

| Example 2 | |
|---|---|
| Ingredient | Parts by Weight |
| Elastomer latex solids | 8 |
| Dimerized rosin ester (Elastomer solvent) | 16 |
| Polyvinyl acetate (Hydrophilic plasticizer) | 28 |
| Glyceryl ester of hydrogenated rosin (Hydrophobic plasticizer) | 6 |
| Paraffin wax (Oleaginous plasticizer) | 30 |
| Glyceryl monostearate (Emulsifier) | 14 |

The chewing gum base is prepared by combining the foregoing ingredients following the procedure of example 1 but omitting the $CaCO_3$ in the feed to blender 3.

It will also be appreciated that the separate mixers 2, 4 and 6 may be replaced by a single variable mixer. In such case, the dry solids comprising the elastomer, elastomer solvent and additives may be blended and then mixed in a mixer under high shear conditions to form the rubbery mass. Thereafter, the hydrophilic plasticizer, hydrophobic plasticizer, filler and pigment may be blended and then mixed with the rubbery elastomer-elastomer solvent-additives mixture in the above mixer under reduced shear conditions but increased folding action. Thereafter, the oleaginous plasticizer and emulsifier may be blended and then mixed in the above mixer with the elastomer-elastomer solvent-additives and hydrophilic plasticizer-hydrophobic plasticizer-filler-pigment mixture under increased folding action and no shear.

As will be apparent, the blenders 1, 3 and 5 may also be eliminated and the individual components may be metered directly into the various mixers 2, 4, 6 or a single mixer as described above.

All of the various blenders and mixers as discussed above are of conventional construction and by themselves do not constitute the present invention.

What is claimed is:

1. A process for preparing a chewing gum base, which comprises mixing chewing gum elastomer and elastomer solvent under high shear conditions to form a first dry solids mixture, mixing the first dry solids mixture with hydrophobic plasticizer and hydrophilic plasticizer under reduced shear conditions and increased folding action to form a second mixture and mixing the second mixture with oleaginous plasticizer and emulsifier under rapid folding action and substantially no shear to form a chewing gum base.

2. The process as defined in claim 1 including the step of preblending the chewing gum elastomer and elastomer solvent prior to mixing thereof.

3. The process as defined in claim 2 including the step of preblending the hydrophilic plasticizer and hydrophobic plasticizer prior to mixing with the first dry solids mixture.

4. The process as defined in claim 3 including the step of preblending the oleaginous plasticizer and emulsifier prior to mixing with the second mixture.

5. The process as defined in claim 1 wherein a single variable mixer is employed.

6. The process as defined in claim 1 wherein the chewing gum elastomer and elastomer solvent are mixed in a high intensity mixer to form the first dry solids mixture; the hydrophilic plasticizer and hydrophobic plasticizer and the first dry solids mixture are mixed in an intermediate intensity mixer to form a second mixture; and the oleaginous plasticizer and emulsifier and second mixture are mixed in a rapid efficient mixer.

7. The process as defined in claim 1 carried out in a continuous manner.

8. A process for preparing a chewing gum base comprising blending a chewing gum elastomer and elastomer solvent to form a first dry solids mix, blending hydrophilic plasticizer and hydrophobic plasticizer to form a second dry solids mix, blending oleaginous plasticizer and emulsifier to form a third dry solids mix, mixing the first dry solids mix under high shear, mixing the so-mixed first dry solids mix and the second dry solids mix under reduced shear and increased folding action, and mixing the first and second dry solids mixture and the third dry solids mix under rapid folding action and substantially no shear to form a gum base.

9. The process according to claim 8 wherein the chewing gum elastomer is present in an amount of from about 5 to about 15% by weight, the elastomer solvent is present in an amount of from about 5 to about 18% by weight, the hydrophilic plasticizer is present in an amount of from about 20 to about 35% by weight, the hydrophobic plasticizer is present in an amount of from about 5 to about 15% by weight, and the oleaginous plasticizer and emulsifier are present in an amount of from about 25 to about 40% by weight.

10. A chewing gum base prepared in accordance with the process of claim 1.

11. A chewing gum base prepared in accordance with the process of claim 8.

12. Apparatus for use in carrying out the process as defined in claim 1, comprising, in combination, high intensity mixing means for mixing chewing gum elastomer solids and elastomer solvent under high shear conditions to form a first dry solids mixture; intermediate intensity mixing means in communication with said high intensity mixing means, for mixing hydrophobic plasticizer and hydrophilic plasticizer and said first dry solids mixture under reduced shear conditions and increased folding action; rapid efficient mixing means in communication with said intermediate intensity mixing means, for mixing oleaginous plasticizer and emulsifier and said second mixture under rapid folding action and substantially no shear to form chewing gum base; and means for recovering the chewing gum base from said rapid efficient mixing means.

13. Apparatus as defined in claim 12 wherein said high intensity mixing means comprises a separate high intensity mixer, said intermediate intensity mixing means comprises a separate intermediate intensity mixer, and said rapid efficient mixing means comprises a separate rapid efficient mixer.

14. The apparatus as defined in claim 13 further including blending means for separately blending chewing gum elastomer solids and elastomer solvent, prior to introducing the same into the higher intensity mixing means, for separately blending hydrophobic plasticizer and hydrophilic plasticizer prior to introducing the same into the intermediate intensity mixing means, and for separately blending oleaginous plasticizer and emulsifier prior to introducing the same into the rapid efficient mixing means.

* * * * *